US011566568B2

(12) United States Patent
Fulton et al.

(10) Patent No.: US 11,566,568 B2
(45) Date of Patent: Jan. 31, 2023

(54) VALVE TIMING MODULATION FOR EGR BALANCING

(71) Applicant: Ford Global Technologies, LLC, Dearborn, MI (US)

(72) Inventors: Brien Lloyd Fulton, Bloomfield Hills, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 17/207,292

(22) Filed: Mar. 19, 2021

(65) Prior Publication Data

US 2022/0298979 A1    Sep. 22, 2022

(51) Int. Cl.
| | | |
|---|---|---|
| F02M 26/01 | (2016.01) | |
| F02D 13/02 | (2006.01) | |
| F02D 41/14 | (2006.01) | |
| F02D 41/00 | (2006.01) | |

(52) U.S. Cl.
CPC ..... *F02D 13/0246* (2013.01); *F02D 41/0002* (2013.01); *F02D 41/006* (2013.01); *F02D 41/0052* (2013.01); *F02D 41/0077* (2013.01); *F02D 41/1461* (2013.01); *F02D 41/1473* (2013.01); *F02D 41/1482* (2013.01); *F02D 41/1483* (2013.01); *F02D 2041/001* (2013.01); *F02D 2041/1419* (2013.01); *F02D 2200/501* (2013.01)

(58) Field of Classification Search
CPC ............. F02D 13/0246; F02D 41/0002; F02D 41/0052; F02D 41/006; F02D 41/0077; F02D 41/1461; F02D 41/1473; F02D 41/1482; F02D 41/1483; F02D 2041/001; F02D 2041/1419; F02D 2200/501; F02D 41/0072; F02D 13/0242; F02D 13/0249; F02D 41/2429; F02D 41/0062; F02D 41/2438; Y02T 10/40; Y02T 10/12; F02M 26/00; F02M 26/01
See application file for complete search history.

(56) References Cited

U.S. PATENT DOCUMENTS

| | | | |
|---|---|---|---|
| 8,370,065 B2 * | 2/2013 | Takashima | .............. F02D 35/02 701/480 |
| 8,543,312 B2 * | 9/2013 | Lee | ........................ F01N 13/009 701/103 |
| 9,279,376 B2 * | 3/2016 | Bucknell | ............. F02D 41/0072 |
| 9,534,542 B2 | 1/2017 | Ku et al. | |

(Continued)

FOREIGN PATENT DOCUMENTS

| | | | | | |
|---|---|---|---|---|---|
| CN | 104564374 A | * | 4/2015 | ........... | F02D 41/005 |
| DE | 102007000094 A1 | * | 9/2007 | ............. | F01N 11/00 |
| JP | 2006250058 A | * | 9/2006 | | |

*Primary Examiner* — George C Jin
*Assistant Examiner* — Teuta B Holbrook
(74) *Attorney, Agent, or Firm* — Vincent Mastrogiacomo; McCoy Russell LLP

(57) ABSTRACT

Methods and systems are provided for increasing EGR delivered to an engine. In one example, a method may include determining an EVO timing set point and an external EGR setpoint in parallel, based on an inverse model. The EVO timing may be adjusted based on a combination of the EVO timing setpoint and an EGR cylinder balancing feedback loop, thereby varying internal EGR to the engine to supplement external EGR.

20 Claims, 9 Drawing Sheets

(56) References Cited

U.S. PATENT DOCUMENTS

| | | | |
|---|---|---|---|
| 9,624,855 B2 | 4/2017 | Leone et al. | |
| 10,041,448 B2 | 8/2018 | Glugla | |
| 10,830,164 B2 * | 11/2020 | Lahti | F02D 41/0072 |
| 2011/0114067 A1 | 5/2011 | Gonzalez Delgado et al. | |
| 2017/0284323 A1 * | 10/2017 | Hagari | F02D 41/2464 |

* cited by examiner

VALVE TIMING MODULATION FOR EGR BALANCING

FIELD

The present description relates generally to methods and systems for exhaust gas recirculation.

BACKGROUND/SUMMARY

Exhaust gas recirculation (EGR) may be implemented in vehicles to mitigate emission of undesirable combustion by-products, such as NOR. Release of NOR to the atmosphere may be reduced by external EGR systems, thereby allowing the NOR to be re-combusted at the engine at less than peak cylinder temperature and a diluted oxygen environment. In recent years, emissions standards have become increasingly stringent, demanding higher delivery of EGR to further mitigate NOR emissions. However, external EGR systems may not be able to meet the demand without becoming increasingly large and costly.

In some examples, an EGR shortcoming may be offset by actuating a throttle plate to decrease an intake manifold pressure. As a result, a larger pressure differential is generated between an exhaust manifold and the intake manifold pressure, drawing higher EGR flow into the intake manifold pressure. Actuating the throttle plate, particularly in a diesel engine, may enhance pumping losses, reduce fuel economy, and may push an operating point of a turbocharger compressor to approach a surge limit, however.

Other attempts to increase EGR include configuring an engine with a dedicated EGR cylinder. One example approach is shown by Ku et al. in U.S. Pat. No. 9,534,542. Therein, an EGR system of an engine includes configuring exhaust valves of a dedicated external EGR cylinder to be selectively opened to recirculate exhaust gas to different locations in an engine, such as at an engine intake downstream of an intake throttle, a pre-compressor location and a post-compressor location. Remaining cylinders of the engine may provide internal EGR by adjusting intake/exhaust valve timing. Delivery and rate of EGR to the different locations via external EGR may be adjusted based on operating conditions and able to maintain engine performance during variations in, for example, torque demand. EGR to the pre-compressor location is introduced at a higher rate during higher engine loads, as compared to a fixed EGR system, and cylinder-to-cylinder balance is improved.

However, the inventors herein have recognized potential issues with such systems. As one example, while varying the distribution of external EGR to the different locations may enable more EGR to be delivered to selected engine regions to increase combustion stability and performance, providing external EGR via a single cylinder does not allow overall EGR flow to be increased. A total amount of EGR, including external EGR at the dedicated cylinder and internal EGR at the remaining cylinders may be constant and therefore unable to adapt to increasing demands for EGR. Furthermore, the EGR system of Ku et al. may only be implemented in an engine with at least one cylinder equipped with multiple exhaust valves. Thus the methods described by Ku et al. may not be readily adapted to a variety of engine types.

In one example, the issues described above may be addressed by a method for determining an exhaust valve opening (EVO) timing setpoint at an engine based on an inverse model, the inverse model continuously updated based on an exhaust gas $NO_x$ measurement, determining an external exhaust gas recirculation (EGR) setpoint based on the inverse model, the external EGR setpoint determined in parallel with the EVO timing setpoint, and adjusting the EVO timing based on a combination of the EVO timing setpoint and an EGR cylinder balancing feedback loop. In this way, throttle actuation to increase EGR is reduced as well as a dependency on external EGR.

As one example, a nested control system used to adjust an amount of EGR delivered to the engine. The nested control system relies on continuous feedback from engine sensors to update EGR delivery which may be supplied via more than one route, including internal EGR, adjustment of external EGR (low pressure and high pressure EGR) valves and throttle actuation. A continuously variable valve lift (CVVL) mechanism may be used to vary the EVO timing when an amount of EGR delivered to the engine does not meet a demand. The adjusted EVO timing may be determined based on feedback from engine sensors which may be input at the outer loop and applied to an inverse model to infer a target EVO timing. Adjustment to the EVO timing via the CVVL mechanism may be implemented by a closed inner loop of the one or more inner loops, providing feedback to continuously update the EVO timing based on engine operation. Other inner loops of the nested control system may include operations for controlling EGR delivery by external EGR systems as well as by throttle actuation. By utilizing inner loops, balancing of EGR delivery between different delivery routes may be enabled and continuously updated. Increasing internal EGR by adjusting the EVO timing may be prioritized over other methods of increasing EGR delivery, thereby allowing a smaller external EGR to be used as well as circumventing adverse effects on engine performance associated with throttle actuation. Furthermore, by preferentially increasing a reliance on internal EGR, faster response time to engine transients is enabled. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
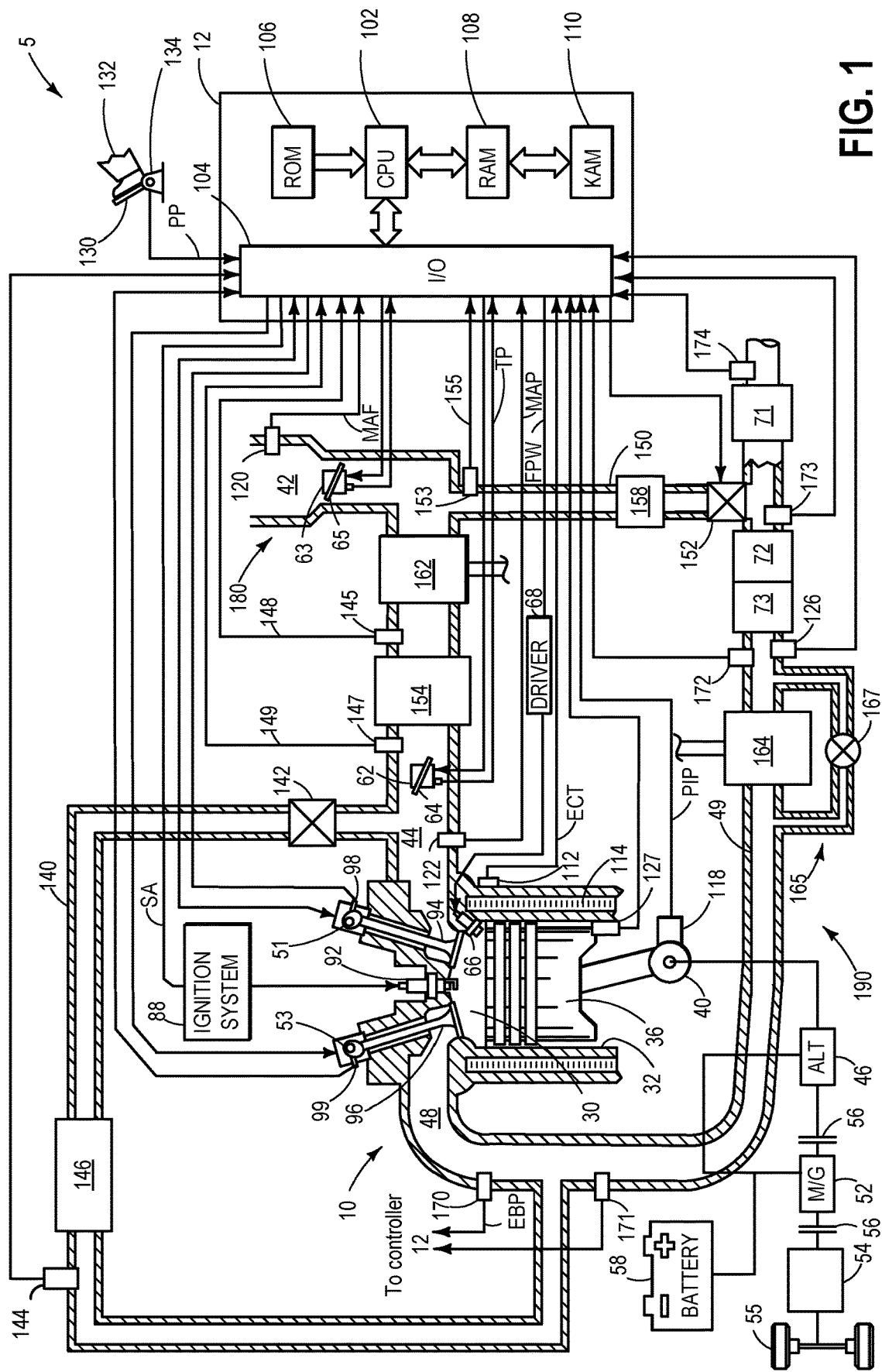
FIG. 1 shows an example of an engine system adapted with both internal and external EGR.
Figure 2:
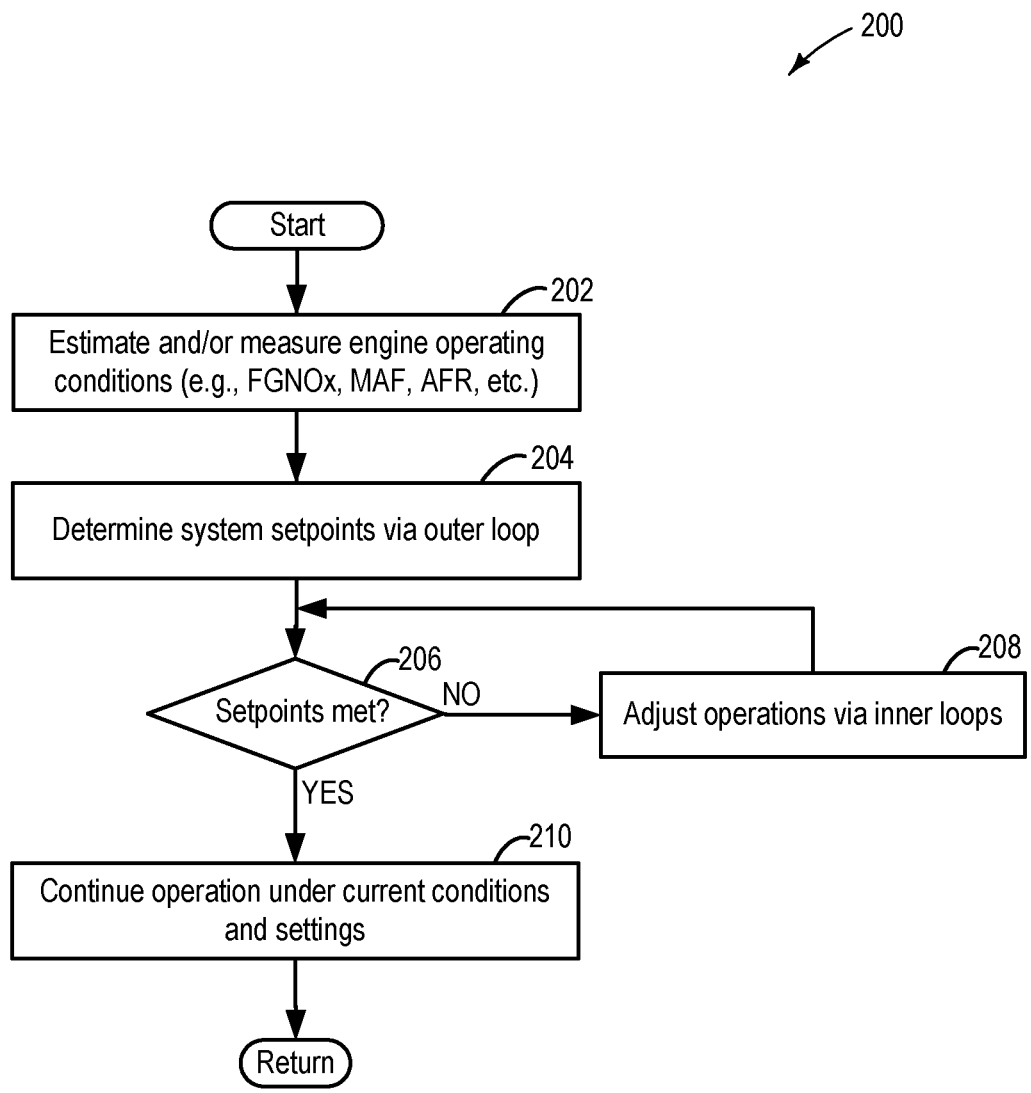
FIG. 2 shows a high level example of a method for controlling EGR delivery to an engine.
Figure 3:
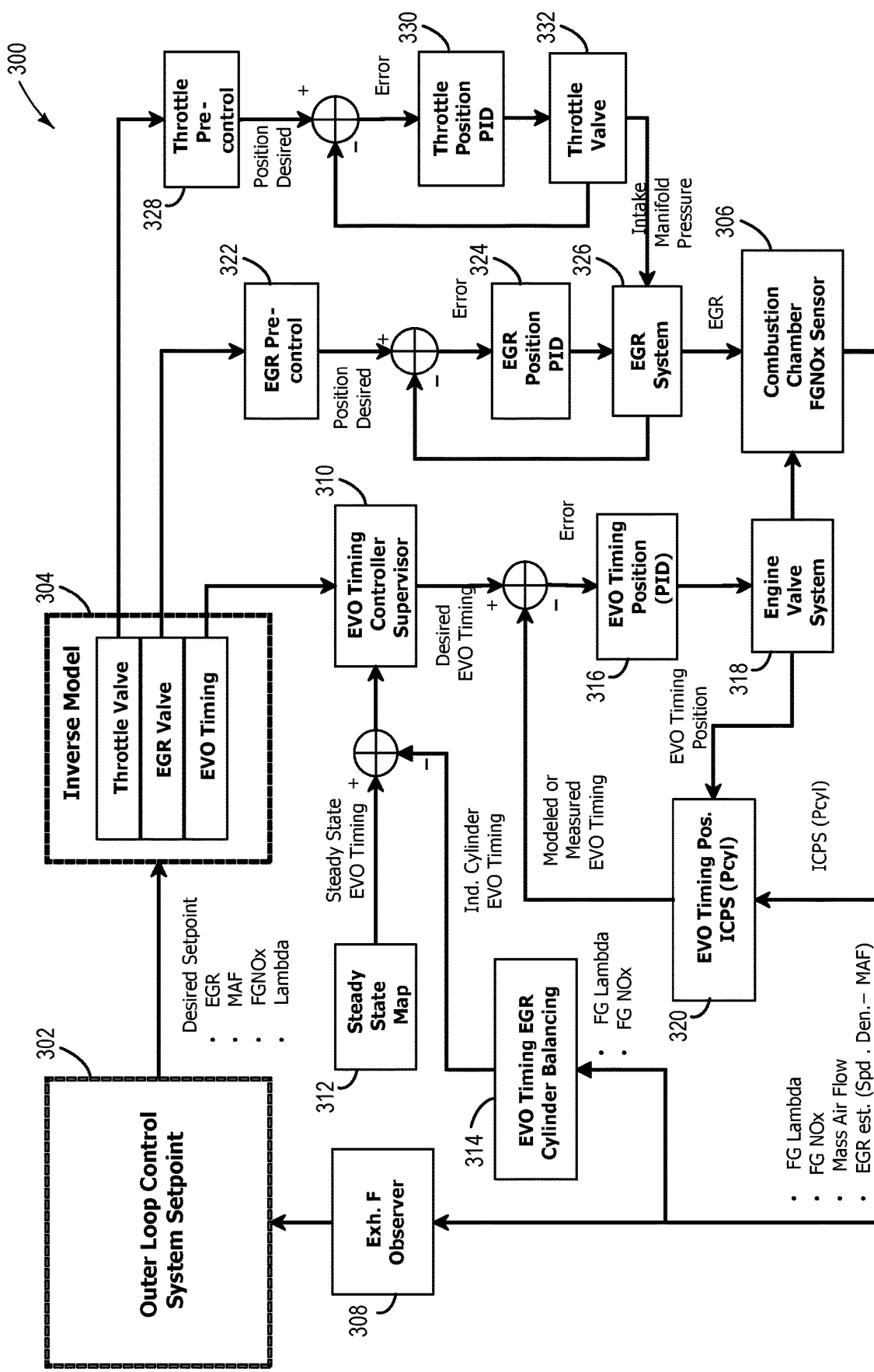
FIG. 3 shows a first example of a nested control system for controlling EGR delivery to an engine via a combination of delivery routes.
Figure 4:
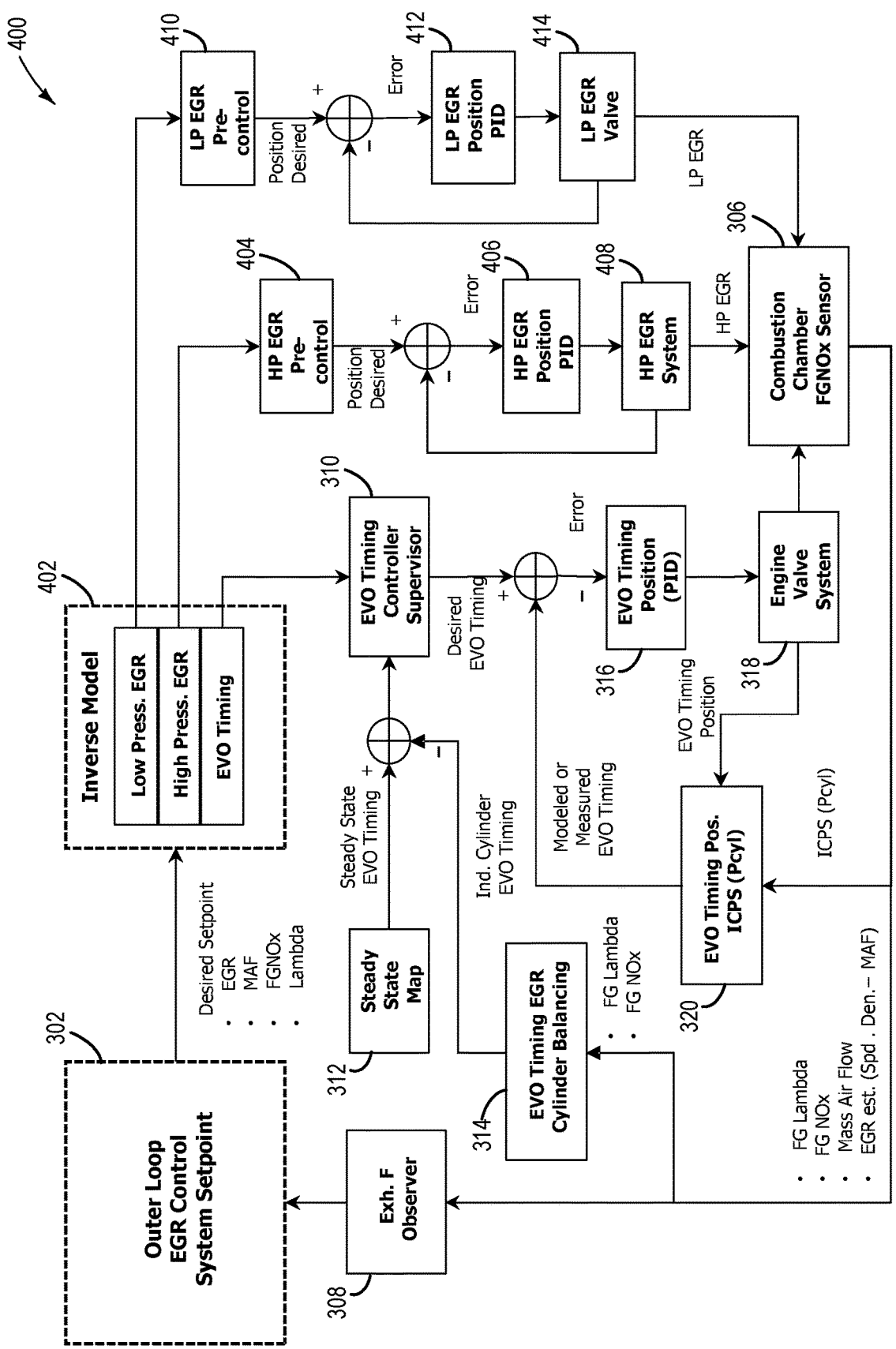
FIG. 4 shows a second example of a nested control system for controlling EGR delivery to an engine via a combination of delivery routes.
Figure 5:
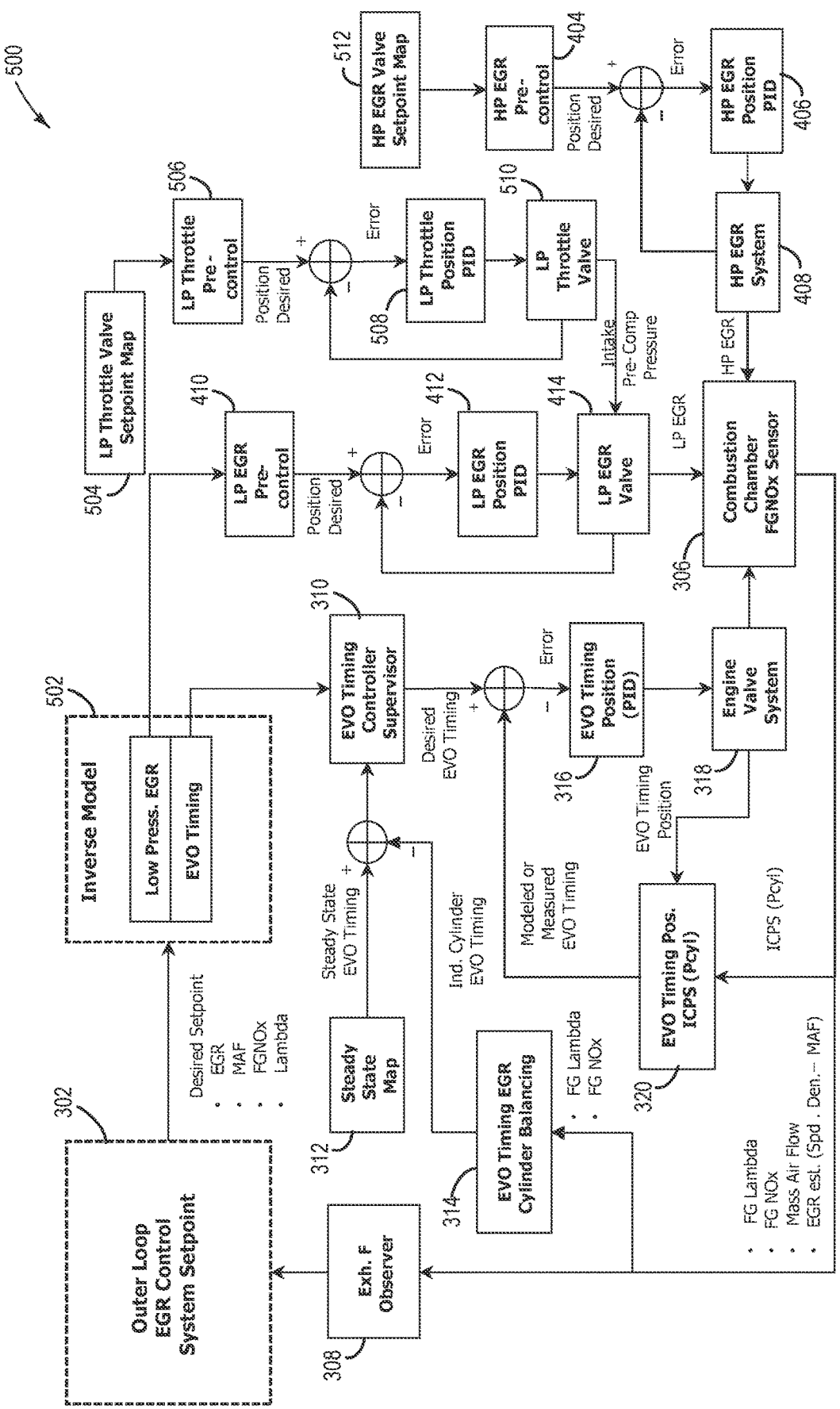
FIG. 5 shows a third example of a nested control system for controlling EGR delivery to an engine via a combination of delivery routes.
Figure 6:
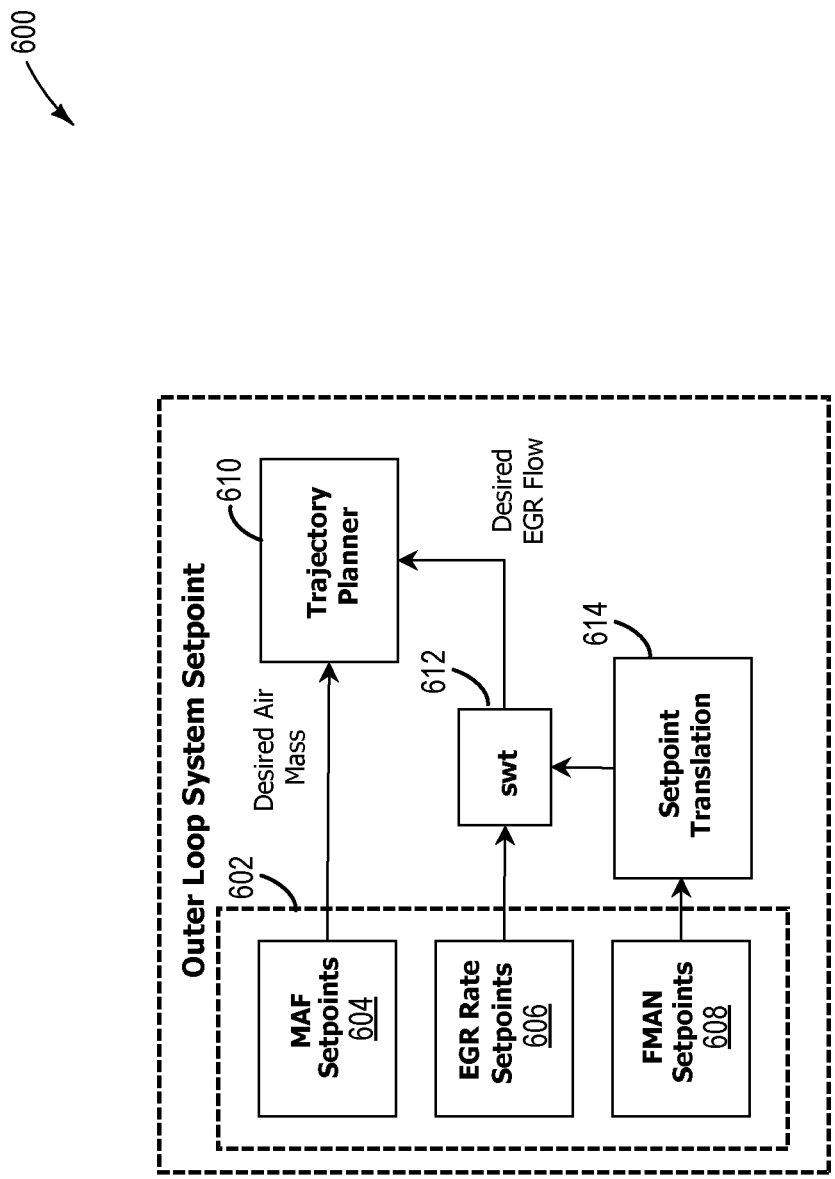
FIG. 6 shows a detailed diagram of an outer loop system setpoint control for a nested control system.
Figure 7:
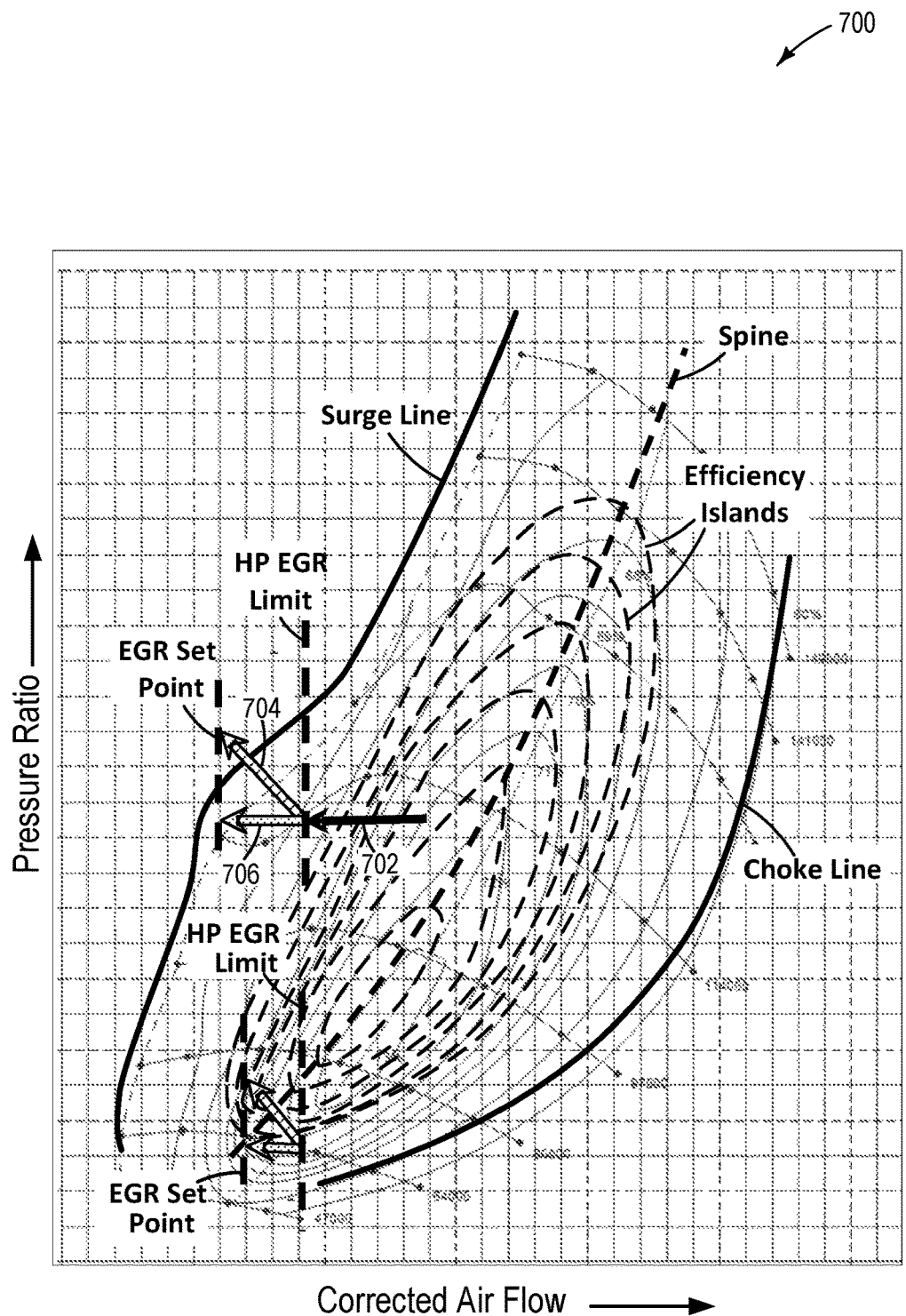
FIG. 7 shows a first compressor map indicating effects of EGR delivery routes on compressor operation.
Figure 8:
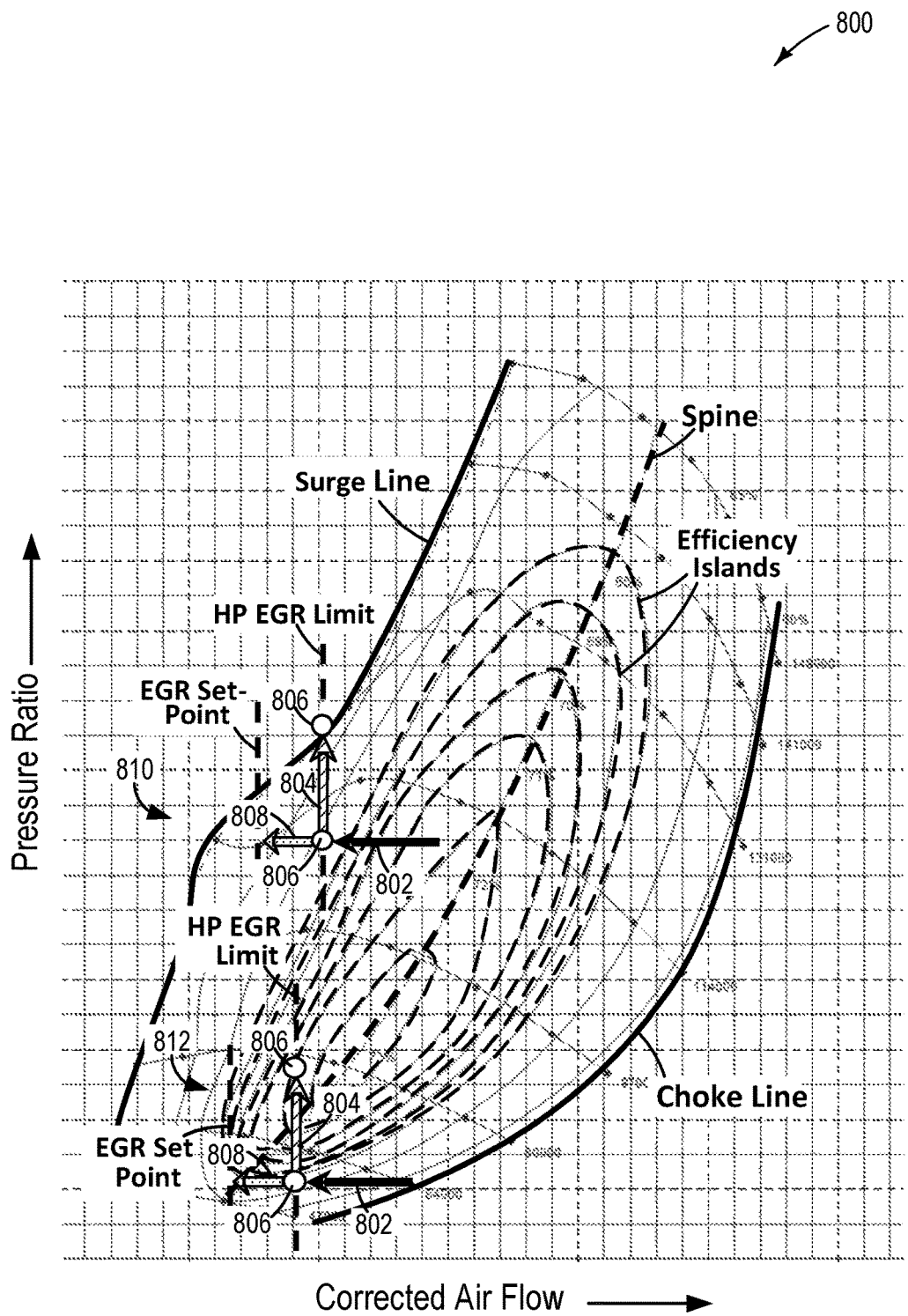
FIG. 8 shows a second compressor map indicating effect of EGR delivery routes on compressor operation.
Figure 9:
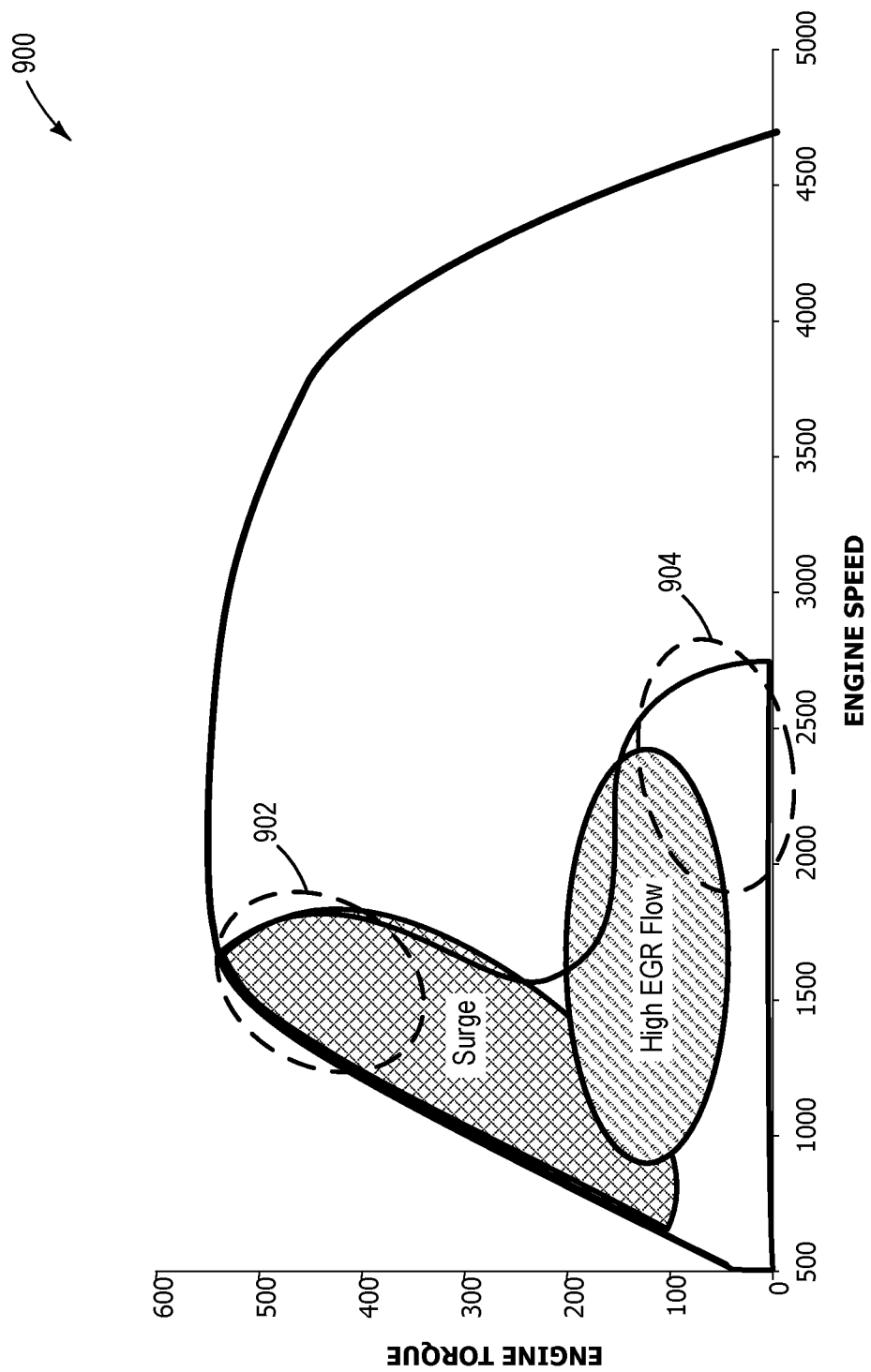
FIG. 9 shows an example of an engine speed/load map indicating preferred regions for select EGR delivery routes.

The following description relates to systems and methods for exhaust gas recirculation (EGR). An amount of EGR delivered to an engine may be adjusted by adapting the engine with internal and external EGR. For example, a cylinder of an engine, an example of which is shown in FIG. 1, may provide internal EGR based on an intake/exhaust valve timing as well as external EGR via passages coupled an exhaust system to an air induction system (AIS) of the engine. By varying the valve timing, internal EGR may be increased, thereby reducing a dependency on external EGR and decreasing a likelihood that throttle actuation is demanded to provide sufficient EGR. Balancing of EGR provided by internal and external routes is enabled based on a nested control system that relies on multiple control loops operating in conjunction with one another. A high level example of a routine for balancing EGR is depicted in FIG. 2. Various examples of the nested control system for synchronized adjustment of internal and external EGR are illustrated in FIGS. 3-5 and a detailed diagram of a system setpoint control for the nested control system is shown in FIG. 6. An effect of EGR delivery route on compressor operation is shown in FIGS. 7 and 8, relative to compressor operating maps. Furthermore, a mode of EGR delivery may be selected based on engine operation according to an engine speed/load map, as shown in FIG. 9.

Referring now to FIG. 1, it shows a schematic diagram of one cylinder of a multi-cylinder engine 10, including an air induction system (AIS) 180 and an exhaust system 190 which may be implemented in a vehicle 5. Engine 10 may be a gasoline or diesel engine and may be at least partially controlled by a control system including controller 12. Engine operations may be adjusted in part based on input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to one or more drive wheels 55 of vehicle 5 via an intermediate transmission system, including a transmission 54. Further, a starter motor (not shown) may be coupled to crankshaft 40 via a flywheel to enable a starting operation of engine 10.

In some examples, vehicle 5 may be a hybrid vehicle with multiple sources of torque available to the one or more vehicle wheels 55. In other examples, vehicle 5 is a conventional vehicle with only an engine or an electric vehicle with only an electric machine(s) 52. In the example shown, vehicle 5 includes engine 10 and electric machine 52. The electric machine 52 may be a motor or a motor/generator. Crankshaft 40 of engine 10 and electric machine 52 are connected via transmission 54 to vehicle wheels 55 when one or more clutch 56 is engaged. In the depicted example, a first clutch 56 is provided between crankshaft 40 and electric machine 52, and a second clutch 56 is provided between electric machine 52 and transmission 54. A controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 40 during engine running. In addition, alternator 46 may power one or more electrical systems of the engine, such as one or more auxiliary systems, including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based on system usage requirements, including auxiliary system demands.

Cylinder 30 may receive intake air from components of the AIS 180, including intake manifold 44 and intake passage 42 and may exhaust combustion gases via components of the exhaust system 190, including exhaust manifold 48 and an exhaust passage 49. Intake manifold 44 and exhaust manifold 48 can selectively communicate with combustion chamber 30, as well as other cylinders of engine 10, via intake valve 94 and exhaust valve 96, respectively. In some embodiments, cylinder 30 may include two or more intake valves and/or two or more exhaust valves.

Intake valve 94 may be controlled by controller 12 via electric valve actuator (EVA) 51. Similarly, exhaust valve 96 may be controlled by controller 12 via EVA 53. Alternatively, each valve actuator may be electro-hydraulic or any other conceivable mechanism to enable valve actuation. During some conditions, controller 12 may vary the signals provided to actuators 51 and 53 to control the opening and closing of the respective intake and exhaust valves. The position of intake valve 94 and exhaust valve 96 may be determined by valve position sensors 98 and 99, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

In one example, the one or more cams may be adapted to a continuously variable valve lift (CVVL) system which may include additional structures, such as rocker arms, eccentrics, etc., to adjust an amount of lift at the intake/exhaust valves as well as a timing of opening and closing of the valves (e.g., phasing). The amount of lift and phasing may be varied according to operating conditions, e.g., engine speed, to increase fuel economy and reduce emissions. Furthermore, by adjusting the phasing to provide overlap between intake and exhaust valve opening, at least a portion of gases combusted during a compression stroke of cylinder 30 may remain within cylinder 30 to be re-combusted during a subsequent cylinder cycle. An amount of internal EGR provided via the CVVL system may be adjusted by modifying the phasing to either increase or decrease overlap between the opening of the valves. Further details of how internal EGR may be adjusted and controlled in combination with external EGR are provided below, with reference to FIGS. 2-4.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into cylinder 30. The fuel injector 66 may be mounted in the side of cylinder 30 or in the top of cylinder 30, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments such as when engine 10 is a diesel engine, cylinder 30 or one or more other cylinders of engine 10 may be operated in a compression ignition mode, with or without an ignition spark.

Intake passage 42 may include throttles 62 and 63 having throttle plates 64 and 65, respectively. In one example, throttle 62 may be a high pressure (HP)-EGR throttle and throttle 63 may be a low pressure (LP)-EGR throttle. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to cylinder 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via a mass air flow (MAF) signal.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 49. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Turbine 164 may be configured as an exhaust turbine and may be arranged in a path of exhaust gas flow, e.g., in exhaust passage 49. Turbine 164 may harvest energy from exhaust gases flowing through the exhaust system 190 to drive rotation of compressor 162. In some examples, as shown in FIG. 1, exhaust passage 49 may include a wastegate 165, including a wastegate valve 167, to divert exhaust gases around turbine 164 when adjustments to rotation of turbine 164 is desired.

A charge air cooler 154 may be included downstream from compressor 162 and upstream of intake valve 94. Charge air cooler 154 may be configured to cool gases that have been heated by compression via compressor 162, for example. As shown in FIG. 1, charge air cooler 154 may be upstream of throttle 62 but may instead be positioned downstream of throttle 62 in other embodiments. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Further, in the disclosed embodiments, an EGR system may route a desired portion of exhaust gas from exhaust passage 49 to intake manifold 44. FIG. 1 shows an HP-EGR system and an LP-EGR system, but an alternative embodiment may include only an LP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, and temperature of the exhaust gas. For example, an HP-EGR sensor 144 may be arranged within HP-EGR passage 140.

In some embodiments, one or more sensors may be positioned within LP-EGR passage 150 (not shown in FIG. 1) to provide an indication of one or more of a mass flow, pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

An overall amount of EGR delivered by internal EGR and external EGR (including LP-EGR and HP-EGR) may be increased by adjusting phasing at the intake/exhaust valves to enhance internal EGR. As such, when EGR demand increases and the EGR system is modified in response, adjusting internal EGR may be prioritized over increasing external EGR flow, as an example. In other examples, balancing of EGR delivery between various methods may be determined based on operating conditions such as the engine and compressor operating conditions. A likelihood that throttle actuation is utilized is thereby reduced which may otherwise be actuated if only external EGR is used to adjust EGR flow and the external EGR is unable to meet the EGR demand. Monitoring of EGR rates may be enabled by the sensors of the EGR system as described above, providing feedback to controller 12 to adjust phasing of exhaust valves at the engine cylinders, via a CVVL system, and actuation of LP-EGR valve 152 and HP-EGR valve 142, accordingly.

Emission control devices 71, 72, and 73 are shown arranged along exhaust passage 49 downstream of exhaust gas sensor 126. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a HC, or a CO sensor, for example. Devices 71, 72 and 73 may be a selective catalytic reduction (SCR) system, a diesel oxidation catalyst (DOC) when engine 10 is a diesel engine, three-way catalyst (TWC), $NO_x$ trap, various other emission control devices, or combinations thereof. For example, when engine 10 is configured as a diesel engine, device 71 may be a SCR system, device 72 may be a diesel particulate filter (PF), and device 73 may be a DOC. In some embodiments, PF 72 may be located downstream of device 71 (not shown in FIG. 1), while in other embodiments, PF 72 may be positioned upstream of device 71 (as shown in FIG. 1).

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed.

Controller 12 may receive various signals from sensors coupled to engine 10, in addition to those signals previously discussed, including measurement of inducted MAF from MAF sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Pressure in cylinder 30 may be monitored by an in-cylinder pressure sensor (ICPS) 127. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Storage medium read-only memory 106 can be programmed with computer readable data representing instructions executable by processor 102 for performing the methods described below as well as other variants that are anticipated but not specifically listed.

Various sensors are also included in the exhaust system 190. For example, an exhaust back pressure (EBP) sensor 170 and a temperature sensor 171 may be arranged in exhaust manifold 48 to measure back pressure and temperature in exhaust manifold 48, respectively. A first $NO_x$ sensor 172, which may be a feed gas $NO_x$ ($FGNO_x$) sensor 172, may be positioned in exhaust passage 49 downstream of turbine 164 to measure $NO_x$ levels in exhaust gas. A second $NO_x$ sensor 173 may be located between device 72 and device 71, near an intersection of the LP-EGR passage 150 with the exhaust passage 49, and a third $NO_x$ sensor 174 may be positioned downstream of device 71. Furthermore, additional temperature sensors may be disposed at various regions within the exhaust system, such as at one or more of the emission control devices, 71, 72, and 73.

Upon receiving the signals from the various sensors of FIG. 1, controller 12 processes the received signals, and employs the various actuators of FIG. 1 (e.g., fuel injector 66 and spark plug 92) to adjust engine operation based on the received signals and instructions stored on the memory 106 of the controller. For example, the controller may receive an indication of an air/fuel ratio in exhaust passage 49 from exhaust gas sensor 126 and determine if EGR is to be adjusted based on the sensor signal. As an example, if the air/fuel ratio indicates that more EGR is desirable, the controller may command opening of the intake valves at an earlier crank angle to increase an amount of internal EGR.

As described above, FIG. 1 shows only one cylinder of a multi-cylinder engine. As such, each cylinder may similarly include its own set of intake/exhaust valves, fuel injector(s), spark plug, etc. Intake air may be distributed to each cylinder via intake manifold 44 and exhaust gases from each cylinder may merge in exhaust manifold 48 before flowing to exhaust passage 49. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 30.

As described above, EGR may be provided via both internal and external processes. In conventional systems, EGR may be delivered primarily by external EGR, e.g., LP-EGR and/or HP-EGR, due to an insufficient amount of EGR offered by internal EGR when valve timing is not readily adjustable. However, as emissions standards have become increasingly strict, even external EGR systems may not be capable of meeting emission targets. While increasing a size of an external EGR system may enable greater EGR, a larger EGR system footprint may be not be desirable with respect to packaging constraints and costs. In such instances, throttle actuation may be applied to restrict air flow to an engine to drive a greater pressure differential between an intake manifold and an exhaust manifold of the engine and thus across an EGR valve, thereby driving increased EGR flow. Throttle actuation may lead to various issues, however, such as increased pumping losses, reduced fuel efficiency, and unstable compressor operation.

Alternatively, EGR rates may be enhanced by increasing re-combustion of exhaust gases via internal EGR. In an engine equipped with CVVL, intake valve opening (IVO) and exhaust valve opening (EVO) timings may be readily adjusted to increase internal EGR by varying valve lift. A response time of internal EGR, which does not rely on external passages and exhaust gas cooling via coolers, may be faster. The fast response time may suppress an initial spike in $NO_x$ generation during transient events. Thus, by increasing use of internal EGR over external EGR, the size of the external EGR system may be decreased, system fouling may be reduced, and throttle actuation may be minimized. Furthermore, adverse effects on vehicle performance and efficiencies associated with external EGR may be mitigated.

Balancing of internal and external EGR, as well as throttle actuation when internal and external EGR do not provide sufficient EGR flow, may be enabled by a nested control system. The nested control system includes an outer loop controlling delivery of EGR to an engine and one or more inner loops. The inner loops may be actuator loops controlling operation of actuators to achieve target system setpoints. For example, each of the inner loops may control an actuator contributing to EGR, such as EVO timing, an EGR valve (e.g., an opening of a LP-EGR and/or HP-EGR valve), and a throttle (e.g., an amount of intake air allowed to flow into the engine). The nested control system may thereby select an order and priority of actuation based on engine operations, e.g., according to an engine operating map during various operating modes such as DPF regeneration, heat maintenance of emission control devices, etc.

The outer loop may utilize output data from engine sensors to actuate the inner loops according to calibrated methods or combinations of methods corresponding to operating points on the engine operating map. A calibration of the nested control system may be performed either dependent on or independent of the engine operating mode. EGR delivery may therefore be optimized for a specific operating point based on various factors including compressor operation according to a compressor map. An effect of EGR delivery method on compressor operation is described further below, with reference to FIGS. 7 and 8. In addition, the EGR flow between engine cylinders may be balanced based on a FGNOx measurement and an air-fuel equivalence ratio (e.g., lambda, $\lambda$, where $\lambda$, is a ratio between an actual air-fuel ratio and a stoichiometric air-fuel ratio) to allow cylinder-specific measurement of EGR with maximum pressure input for each cylinder.

The nested control loop thereby provides numerous delivery options for EGR, including delivery via the EGR valve (e.g., the LP-EGR valve or HP-EGR valve) exclusively, by EVO timing exclusively, by both the EGR valve and EVO timing independently, by the EGR valve first until saturation is reached followed by EVO timing, by EVO timing first until maximum internal EGR is reached followed by the EGR valve, and by a combination of the EGR valve and the throttle. Another combination of EGR delivery includes actuating the EGR valve until saturation is reached, then adjusting EVO timing until maximum internal EGR is reached, followed by throttle actuation. Alternatively, EVO timing may be adjusted first until maximum internal EGR is reached, then actuating the EGR valve until saturation is reached, followed by throttle actuation. In yet another example of combining EGR delivery methods includes actuating the EGR valve until saturation is reached, followed by actuation of the throttle, and then adjusting EVO timing.

A high level example of a routine 200 for delivering EGR to an engine is depicted in FIG. 2. Routine 200 may be implemented at an engine, such as engine 10 of FIG. 1. In one example, the engine may be a diesel engine configured with one or more throttles to control flow of intake air to cylinders of the engine when throttle actuation is desired for adjusting EGR flow. A control system of the engine may include a controller, such as controller 12 of FIG. 1, at which a nested control system may be utilized to determine EGR delivery modes according to engine operation conditions. The nested control system includes an outer loop and one or more inner loops, where the outer loop provides system control and the inner loops provide actuator control. Instructions for carrying out routine 200 and the rest of the methods included herein may be executed by the controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, routine 200 includes estimating current operating conditions. For example, signals from $NO_x$ sensors, including a $FGNO_x$ sensor such as the $FGNO_x$ sensor 172 of FIG. 1, from MAF sensors (e.g., the MAF sensor 120 of FIG. 1) positioned in intake and exhaust systems of the engine, from an exhaust gas sensor measuring an AFR of exhaust gas (e.g., the exhaust gas sensor 126 of FIG. 1), from a Hall effect sensor (e.g., the Hall effect sensor 118 of FIG. 1), from an ICPS such as the ICPS 127 of FIG. 1, etc., to determine an engine status and infer an amount of EGR flowing to the engine.

System setpoints are determined at 204 via the outer loop. The system setpoints may include targets for various operations such as a target rate of EGR, a target MAF into the engine, a target FMAN (e.g., a target fraction of combusted gases in a mixture of gases flowed to the engine intake, including air, fuel, and exhaust gas), etc. The system setpoints may be estimated according to the current operating conditions, as monitored by the sensors of the engine and described in greater detail with reference to FIG. 6.

At 206, routine 200 includes confirming if the system setpoints are met. If one or more of the setpoints are not met, engine operations are adjusted using the inner loops at 208. For example, if the rate of EGR does not meet the target rate, one or more of EVO timing, EGR valve actuation, and throttle actuation may be adjusted to increase or decrease the EGR rate accordingly. As another example, if MAF into the engine is greater or less than the target MAF, compressor operation may be adjusted and/or a throttle position (for a gasoline engine) may be modified to either increase or decrease MAF until the target quantity is attained.

If the system setpoints are met, routine 200 proceeds to 210 to continue engine operations under the current conditions and settings. The routine returns to the start.

Exemplary embodiments of a nested control system for EGR delivery are shown in FIGS. 3-5, which may be implemented in an engine, such as engine 10 of FIG. 1. More specifically, the engine may be a diesel engine. Turning first to FIG. 3, a first example of a nested control system 300 for HP-EGR is shown. An outer control loop of the nested control system 300 includes determination of system setpoints at 302 (described in greater detail below with reference to FIG. 6), execution of an inverse model at 304, determination of FGNOx at 306, and sensor input to an observer at 308. The nested control system 300 also includes a first inner loop providing EVO timing control for delivery of internal EGR, a second inner loop providing EGR valve control for delivery of external EGR, and a third inner loop providing throttle control for adjusting a pressure gradient across an HP-EGR valve to increase EGR when desired. The outer control loop, first inner loop, second inner loop, and third inner loop are all closed loops in the nested control system 300, where a closed loop is a loop receiving input from and updated based on the outer loop. In contrast, an open loop is a loop that operates independent of the outer control loop.

The system setpoints at 302 may include target values for an EGR rate, a MAF, a FGNO$_x$, and λ, for example. The system setpoints may be applied to the inverse model at 304 to compare with input data from sensors (e.g., as collected by the observer at 308). A difference between the system setpoints and the input data from the sensors is assessed by the inverse model and if present, commands may be sent to one or more of the first, second, and third inner loops. For example, adjustment of EVO timing to increase internal EGR via the first inner loop may be commanded.

The first inner loop includes sending results from the inverse model to an EVO timing controller supervisor at 310. The EVO timing controller supervisor may also receive input from a steady state map 312 of EVO timing as well as from an EGR cylinder balancing operation 314, which is described further below. The EVO timing controller supervisor may compare a current EVO timing with the timing estimated based on the inverse model at a EVO timing position (proportional-integral-derivative) PID controller at 316. For example, an error calculation may be made by the EVO timing position PID controller representing a difference between the estimated, target timing and the current EVO timing. Any adjustments to EVO timing to be made, as determined by the EVO timing position PID controller, may be commanded at an exhaust valve system of the engine, e.g., at valve actuators, at 318. For example, a CVVL system may be actuated to vary a timing at which one or more exhaust valves are opened. A cylinder pressure, as measured by an ICPS, may be used at 320 to loop back and update the EVO timing position with the PID controller to compare an actual EVO timing to the desired EVO timing for the timing error that the PID controller acts on.

The adjusted EVO timing may also be correlated to NO$_x$ levels as detected by the FGNO$_x$ sensor at 306. For example, the FGNO$_x$ may be used as an input to the observer at 308 and the outer control loop to determine the desired EGR. For example, if the EVO timing is advanced, moving the EVO event earlier in the expansion stroke, less internal EGR is captured in-cylinder which may increase NO$_x$ emissions. If the EVO timing is retarded, moving the EVO event later in the expansion stroke, more internal EGR is captured in-cylinder, which may reduce NO$_x$ emissions.

The second inner loop includes sending results from the inverse model, as determined at 304, to an EGR pre-control at 322 to check a status of the EGR valve. The status of the EGR valve as well as the inverse model results are sent to an EGR valve position PID controller at 324 which determines a difference between a current EGR valve position and an estimated, target EGR valve position. The EGR valve position is adjusted at 326 based on a determination from the EGR valve position PID controller. For example, an opening of the EGR valve may be adjusted to be more or less open. The adjusted EGR valve position may be looped back to compare with a target position inferred by the EGR position PID controller. The adjusted EGR valve position may also be correlated to NO$_x$ levels as detected by the FGNO$_x$ sensor at 306 to be used as another feedback option to the observer and outer control loop.

The third inner loop includes sending results from the inverse model to a throttle pre-control to check a status of the throttle at 328. The status of the throttle as well as the inverse model results are sent to a throttle position PID controller at 330 which performs an error calculation to determine a difference between a current throttle status and the estimated, target throttle position. A valve of the throttle (e.g., a butterfly valve), may be adjusted at 332 based on the difference and the adjusted throttle position may be looped back to the throttle position PID controller. The adjusted throttle position may directly affect the EGR valve position adjustment at 326, when the third inner loop is activated, due to an effect of the throttle valve position on a pressure gradient across the EGR valve, e.g., a pressure differential between an intake manifold and an exhaust manifold. The pressure gradient may control the opening of the EGR valve.

The NO$_x$ level measured by the FGNO$_x$ sensor may be used to determine a relationship between NO$_x$ in the exhaust gases and EVO timing as measured by cylinder pressure by the ICPS at 320. The measured NO$_x$ level may also be sent as an input signal to the observer at 308. Furthermore, the measured NO$_x$ level, as well as λ, may be used for EGR cylinder balancing at 314. EGR cylinder balancing may be executed independent of the outer loop (as well as the inner loops) as the EGR cylinder balancing may be sufficiently fast to not interfere with the outer loop and inner loop control. Balancing of the cylinders may include comparing the measured FGNO$_x$ and λ at each cylinder of the engine to threshold values for FGNO$_x$ and λ. EVO timing may be modified at each individual cylinder to equalize power amongst the cylinders. The EVO timing resulting from cylinder balancing may be added to the steady state map input to the EVO timing controller supervisor, as shown in FIG. 3. However, in other examples, the EVO timing for cylinder balancing may instead be input to adjust the EVO timing for EGR delivery from the outer control loop or directly input at the EVO timing controller supervisor.

In other examples, one or more of the inner loops may be modified to become an open loop, e.g., not included in the inverse model. As such, the setpoints for the open loop EGR route may be determined based on engine mapping, instead of being continuously updated, and does not change during a lifetime of a vehicle. For example, EVO timing and throttle position may be included in the inverse model and used to trim internal and external EGR to supplement HP-EGR provided by an open loop HP-EGR valve position. The EVO timing is used to trim the total EGR delivered to the engine and throttle actuation is used only when internal EGR does not provide sufficient supplemental EGR to meet the demand.

As another example, only EVO timing may be included in the inverse model and both EGR valve position and throttle position may each be open loops. The EVO timing may be used to trim internal EGR to supplement EGR provided by open loop HP-EGR. Throttle actuation, via open loop control, is applied to small operating regions where adjustment of the open loop HP-EGR valve position does not provide sufficient flow. As such, a response time of the nested control system may be faster due to an ability of the EVO timing to adjust internal EGR according to demand and supply via the open loop EGR routes. In addition, a complexity of the nested control system is reduced.

As described above, a control architecture shown in FIG. 3 by the nested control system 300 allows EGR to be delivered by different routes (e.g., internal vs. external vs. throttle actuation) and in various combinations, route order and route priority according to operating conditions. As such, throttle actuation may be minimized and reliance on external EGR may be decreased, allowing external EGR hardware with a smaller footprint to be used. A response time of the EGR system (the overall EGR system including all routes) to transient events may be faster, leading to increased engine performance while reducing emissions.

The nested control system may also be applied to engines equipped with both LP- and HP-EGR. A second example of a nested control system 400 is depicted in FIG. 4, where elements already described in FIG. 3 are similarly numbered and will not be re-introduced. At 402, an inverse model of an outer loop of the nested control system 400 may transmit a command to adjust an EVO timing via a first inner loop, as described above with reference to FIG. 3. The inverse model may also use input data and system setpoints to adjust HP-EGR via a second inner loop.

At the second inner loop, the results from the inverse model may be sent to an HP-EGR pre-control at 404 to check a status of the HP-EGR valve. The status of the HP-EGR valve as well as the inverse model results are sent to an HP-EGR valve position PID controller at 406 which determines a difference between a current HP-EGR valve position and an estimated, target HP-EGR valve position. The HP-EGR valve position is adjusted at 408 based on results from the HP-EGR valve position PID controller. For example, an opening of the HP-EGR valve may be adjusted to be more or less open. The adjusted HP-EGR valve position may be looped back to compare with a target position by the HP-EGR position PID controller. The adjusted HP-EGR valve position may also be correlated to $NO_x$ levels as detected by the $FGNO_x$ sensor at 306 to adjust the desired EGR flow setpoint for the HP-EGR system.

In addition, the results from the inverse model may be sent to an LP-EGR pre-control at 410 to check a status of the LP-EGR valve. The status of the LP-EGR valve as well as the inverse model results are sent to an LP-EGR valve position PID controller at 412 which determines a difference between a current LP-EGR valve position and an estimated, target LP-EGR valve position. The LP-EGR valve position is adjusted at 414 based on results from the LP-EGR valve position PID controller. For example, an opening of the LP-EGR valve may be adjusted to be more or less open. The adjusted LP-EGR valve position may be looped back to compare with a target position by the LP-EGR position PID controller. The adjusted LP-EGR valve position may also be correlated to $NO_x$ levels as detected by the $FGNO_x$ sensor at 306 to adjust the desired EGR flow setpoint for the LP-EGR system.

The nested control system 400 may further include parallel throttle control inner loops for each of the LP-EGR and HP-EGR systems, as shown in FIG. 3, and are omitted in FIG. 4 for simplicity. Incorporation of both LP-EGR and HP-EGR as closed inner loops allows use of either EGR systems and EVO timing to balance EGR flow for optimized operation. Furthermore, the nested control system 400 of FIG. 4 enables fast responses to transient changes via EVO timing with supplementary adjustments provided by LP-EGR and HP-EGR. In some instances, partitioned use of the EGR system may be supported, thereby allowing omission of an HP-EGR cooler as a result of sufficiently fast response time due to LP-EGR. Thus, in high speed and high load areas associated with higher exhaust flows and higher EGR temperatures, HP-EGR may not be demanded.

In some examples, one or more of the inner loops of the nested control system 400 may be modified to an open loop. For example, the inverse model may include EVO timing and HP-EGR (and the HP-EGR throttle) and LP-EGR (as well as the LP-EGR throttle) may be operated as an open loop. LP-EGR may be run independently in the background which may reduce an amount of EGR demanded by HP-EGR and EVO timing. As another example, HP-EGR may be operated as an open loop with EVO timing and LP-EGR run as closed inner loops. In yet another example, only EVO timing may be included in the inverse model to provide transient control.

A third example of a nested control system 500 is shown in FIG. 5 where the system includes similar elements shown previously in FIGS. 3 and 4 and will not be re-introduced for brevity. The inverse model 502 includes the first inner loop for adjusting EVO timing and a second inner loop for adjusting the position of the LP-EGR valve (as depicted in the third inner loop of the nested control system 400 of FIG. 4). The nested control system 500 includes two open loops: a first open loop controlling a position of a LP throttle (e.g., the throttle 63 of FIG. 1) and a second open loop controlling HP-EGR.

The LP throttle may be adjusted independent of the inverse model, according to setpoints from an engine map at 504. The setpoints may be sent to an LP pre-control at 506 where a status of the LP throttle is verified. The status of the LP throttle as well as the setpoints are sent to an LP throttle position PID controller at 508 which determines a difference between a current LP throttle position and an estimated, target LP throttle position. The LP throttle position is adjusted at 510 based on results from the LP throttle position PID controller. For example, an opening of the LP throttle may be adjusted to be more or less open. The adjusted LP throttle position may be used to modify the position of the LP-EGR valve at 414. For example, an intake pressure upstream of a compressor may vary based on the LP throttle position which may, in turn moderate an opening of the LP-EGR valve.

The second open loop controlling HP-EGR includes adjusting the HP-EGR valve position according to setpoints from an engine map at 512. The setpoints are sent to the HP-EGR pre-control at 404, and the results from the HP-EGR position PID controller are used to adjust the opening of the HP-EGR valve at 408, as described above. The HP-EGR open loop may also be coupled to a parallel HP-EGR throttle open loop, similar to the first open loop of the nested control system 500 described previously.

The nested control system 500 of FIG. 5 may allow the outer loop to adjust EGR during transients using EVO timing and facilitate longer term, slower adjustments using LP-EGR, with HP-EGR operating in the background independently. The longer term LP-EGR adjustments may enable the EVO timing to eventually return to an optimal timing and criteria for controller decisions may be applied over an entire engine operating map in different engine operating modes (e.g., DFT regeneration, heat maintenance, etc.).

The system setpoints of the outer loop of the nested control system may be determined using signals received from engine sensors which may be input into the controller to enable estimation of the setpoints based on controller algorithms. For example, as shown in FIG. 6, an example of an outer loop system setpoint control 600 includes parameter setpoints 602. The parameter setpoints 602 may include MAF setpoints 604, EGR rate setpoints 606, and FMAN setpoints 608. The MAF setpoints are sent to a trajectory planner 610, indicating a desired air mass. At the trajectory planner 610, a path from a first point to a second point is provided, e.g., motion planning is enabled in two-dimensional or three-dimensional space.

The EGR rate setpoints may be sent to a swt 612 that can decide which method is used to determine the EGR setpoint based on one or multiple criteria that can include, but is not limited to, open loop map, engine operating mode, EGR mode (e.g., HP only, LP only, combination of LP and HP)

engine hardware sensor set, ambient inputs for altitude and temperature and then sent to the trajectory planner as a desired EGR flow. The FMAN setpoints may be first sent to a setpoint translation 614 to change the input from lambda or FGNOx to a desired EGR rate. The translated information is then sent to the swt as an option to use to determine the EGR rate.

A balancing of EGR between the available EGR routes (e.g., EVO timing, LP-/HP-EGR systems, and throttle actuation), with respect to application of the nested control system, may be determined at least partially based on compressor operation. For example, as shown in FIG. 7, an example of EGR balancing on compressor operation is depicted in a first compressor map 700. The compressor map 700 plots a pressure ratio across a compressor, e.g., compressor 162 of FIG. 1, relative to air flow through the compressor and includes a plurality of efficiency islands, indicating concentric regions representing compressor efficiency. Efficiency decreases as the concentric regions increase in size. The compressor map 700 also includes a spine which indicates maximum efficiency points according to compressor speed.

Compressor operation is bound on a left-hand side by a surge line, beyond which flow becomes unstable, and bound on a right-hand side by a choke line, defining a boundary beyond which compressor efficiency drops below a threshold, such as 58%. HP-EGR limits are indicated as well as EGR setpoints. Assuming a steady state start point with a constant boost pressure setpoint, an increase in HP-EGR to the HP-EGR limit, according to an EGR demand is indicated by arrow 702. If the EGR demand increases above the HP-EGR limit, two options may be available: supplementation by throttle actuation, as indicated by arrow 704, and supplementation by EVO timing, as indicated by arrow 706.

When throttle actuation is used to increase EGR flow, an opening of a throttle valve is decreased, thereby reducing air flow to the compressor and increasing the pressure ratio. Compressor operation is driven closer to or at the surge line, decreasing compressor efficiency. However, when internal EGR is used to meet the EGR demand, via EVO timing, air flow also decreases but the pressure ratio is not affected. Thus compressor operation moves horizontally left, maintaining greater surge margin than throttle actuation and maintaining higher efficiency while increasing EGR flow relative to throttle actuation.

An additional effect of LP-EGR and LP throttle actuation is shown in a second compressor map 800. The second compressor map 800 is similarly plotted as the first compressor map 700 of FIG. 7, e.g., depicting the surge line, choke line, efficiency islands, spine, HP-EGR limits and EGR setpoints. Again, a steady state start point with a constant boost pressure setpoint is assumed and an increase in HP-EGR to the HP-EGR limit, according to an EGR demand is indicated by arrows 802.

When the EGR demand increases beyond the HP-EGR limit, increasing EGR by LP throttle actuation, as indicated by arrows 804, intake pressure is decreased to increase flow across the LP-EGR valve. While increasing LP-EGR, as indicated by points 806, does not change either compressor pressure ratio or air flow, decreasing an opening of the LP-throttle valve may increase the pressure ratio without changing the air flow. Increasing internal EGR via EVO timing, as indicated by arrows 808, decreases air flow but does not alter the pressure ratio. Thus a balance between LP throttle actuation and EVO timing may be determined by an operating point of the compressor.

For example, in a first region of compressor operation 810, increasing EGR by LP throttle actuation may drive compressor operation near or to the surge line, resulting in compressor instability. Adjusting EVO timing to increase internal EGR may therefore be selected. In a second region 812, however, both LP throttle actuation and EVO timing adjustment may maintain a large surge margin. Furthermore, LP throttle actuation may shift compressor operation to a higher efficiency region. LP throttle actuation may be prioritized over EVO timing in a low pressure ratio/high air flow zone of compressor operation while EVO timing may be prioritized at a high air flow/high pressure ratio operating zone.

In addition, selection of EGR delivery route may depend on engine operation. For example, an engine map 900 is illustrated in FIG. 9, plotting engine torque relative to engine speed. A compressor surge region of engine operation is indicated as well as a high EGR flow region of engine operation. A first zone 902 may be an area of engine operation, e.g., low engine speed/high torque, where adjusting EVO timing is preferred over throttle actuation to increase EGR flow and efficiency. A second zone 904 indicates an area of engine operation at low torque/high engine speed where throttle actuation is desirable over adjusting EVO timing to increase EGR flow and efficiency.

Furthermore, with respect to an engine operating map of an engine, application of EVO timing to increase internal EGR may delay use of an EGR cooler to cool gases. Delaying the use of the EGR cooler may expedite engine warming and heating of emission control devices. Additionally, in some examples, a combination of HP-EGR, LP-EGR, and EVO timing adjustment may be applied in conjunction only when engine speed and load is above a threshold as defined by a calibratable map that is determined by engine testing. This may allow for removal of an HP-EGR cooler and a reduction in a size of the HP-EGR system.

In this way, delivery of EGR to an engine may be balanced between different routes to optimize engine and compressor operation while meeting an EGR demand. More specifically, internal EGR may be increased when the EGR demand increases beyond a capability of an external EGR system by varying EVO timing via a CVVL system. EGR balance may be enabled by implementing a nested control system at vehicle controller where the nested control system may allow EGR to be delivered by various combinations of delivery routes, including LP-EGR, HP-EGR, EVO timing, and throttle actuation. Prioritization and order of use of the delivery routes may be selected based on whether the mode of EGR delivery is controlled by an open control loop versus a closed control loop. As a result, use of throttle actuation may be reduced as well as a size of the external EGR system. Furthermore, increased reliance on internal EGR may allow the EGR system to respond more rapidly to transient events. Emission control may thereby be maintained without adversely affecting engine performance.

The technical effect of increasing internal EGR by adjusting EVO timing is EGR delivery to an engine is increased without throttle actuation. A further technical effect includes meeting an EGR demand without recirculating and cooling more exhaust gases through external passages of the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The disclosure also provides support for a method comprising: determining an exhaust valve opening (EVO) timing setpoint at an engine based on an inverse model, the inverse model continuously updated based on an exhaust gas NOx measurement, determining an external exhaust gas recirculation (EGR) setpoint based on the inverse model, the external EGR setpoint determined in parallel with the EVO timing setpoint, and adjusting the EVO timing based on a combination of the EVO timing setpoint and an EGR cylinder balancing feedback loop. In a first example of the method, determining the EVO timing setpoint and the external EGR setpoint includes inputting data from engine sensors into an outer loop of a nested control system, the outer loop including the inverse model. In a second example of the method, optionally including the first example, adjusting the EVO timing includes commanding modification of a cam phasing at a continuously variable valve lift (CVVL) system via an EVO inner loop of the nested control system and wherein the inner loop includes an EVO timing controller supervisor and an EVO timing position proportional-integral-derivative (PID) controller. In a third example of the method, optionally including one or both of the first and second examples, adjusting the EVO timing further includes providing feedback to the PID controller to modify the EVO timing based on a cylinder pressure measured by an in-cylinder pressure sensor. In a fourth example of the method, optionally including one or more or each of the first through third examples, determining the adjusting of the EVO timing further includes inputting a map of EVO timing during steady state engine operation to the EVO inner loop. In a fifth example of the method, optionally including one or more or each of the first through fourth examples, adjusting the EVO timing includes varying the EVO timing to supplement an amount of EGR provided by external EGR when the external EGR is unable to meet an EGR demand.

The disclosure also provides support for a method for an engine, comprising: responsive to an increased demand for EGR at the engine, collecting information from engine sensors to determine an amount of EGR delivered to the engine, estimating a target EGR setpoint based on the information from the engine sensors via an outer loop of an EGR control system, and responsive to determination of an EGR shortfall, increasing internal EGR via a first closed inner loop of the EGR control system. In a first example of the method, collecting information from the engine sensors includes receiving signals from one or more of a feed gas NOx sensor, a mass air flow sensor, and an exhaust gas sensor, the exhaust gas sensor inferring an air-to-fuel ratio at the engine. In a second example of the method, optionally including the first example, increasing internal EGR includes adjusting an exhaust valve opening (EVO) timing using a continuously variable valve lift (CVVL) mechanism based on the first closed inner loop and wherein the first closed inner loop is an operation to adjust EVO timing control based on feedback from the engine sensors and an estimated target EVO timing. In a third example of the method, optionally including one or both of the first and second examples, the method further comprises: responsive to the increased demand for EGR at the engine, adjusting a position of an EGR valve of an external EGR system via a second closed inner loop to balance EGR delivery between internal EGR and the external EGR system and wherein the second closed inner loop is an operation to adjust external EGR flow based on feedback from the engine sensors and an estimated target external EGR flow. In a fourth example of the method, optionally including one or more or each of the first through third examples, the method further comprises: adjusting a position of a throttle to decrease air flow to the engine via a third closed inner loop when a combination of internal EGR and external EGR are unable to meet an EGR demand at the engine and wherein the third closed inner loop is an operation to adjust throttle position based on feedback from the engine sensors and an estimated target pressure gradient generated by the throttle position. In a fifth example of the method, optionally including one or more or each of the first through fourth examples, the method further comprises: responsive to the determination of the EGR shortfall, prioritizing the increasing of the internal EGR over adjusting of the position of the throttle to meet the EGR demand. In a sixth example of the method, optionally including one or more or each of the first through fifth examples, increasing the internal EGR includes supplementing an amount of EGR provided by an external EGR system and wherein the external EGR system is controlled by an open inner loop of the EGR control system based on setpoints provided by an engine operating map. In a seventh example of the method, optionally including one or more or each of the first through sixth examples, EGR from the external EGR system is delivered to the engine by one or more of a low pressure (LP)-EGR system and a high pressure (HP)-EGR system and each of the LP-EGR and the HP-EGR systems are controlled by one of a closed inner loop or an open inner loop. In an eighth example of the method, optionally including one or more or each of the first through seventh examples, increasing the internal EGR includes supplementing an amount of EGR provided by an external EGR system and actuating a throttle when a combination of the internal EGR and the external EGR system does not meet an EGR demand and wherein the actuation of the throttle is controlled by an open inner loop of the EGR control system based on setpoints provided by an engine operating map. In a ninth example of the method, optionally including one or more or each of the first through eighth examples, increasing the internal EGR via the first closed inner loop includes inputting a target EVO timing to a PID controller to determine a difference between a current EVO timing and the target EVO timing and adjusting the current EVO timing based on the determined difference. In a tenth example of the method, optionally including one or more or each of the first through ninth examples, adjusting the EVO timing further includes incorporating cylinder balancing into the current EVO timing based on an estimated air-to-fuel ratio at each cylinder of the engine and moderating the current EVO timing at each cylinder to achieve the cylinder balancing.

The disclosure also provides support for an engine, comprising: a plurality of cylinders, each cylinder having one or more exhaust valves controlling exhaust flow out of the plurality of cylinders, a continuously variable valve lift (CVVL) system configured to adjust a timing of the one or more exhaust valves, one or more throttles controlling air flow to the plurality of cylinders, one or more of a low pressure (LP)-EGR system and a high pressure (HP)-EGR system, each of the LP-EGR system and the HP-EGR system configured to return exhaust gases to the plurality of cylinders through external passages of the engine, a compressor arranged in a path of air flow to the plurality of cylinders, and a controller configured with executable instructions stored in non-transitory memory which, when executed, cause the controller to: balance EGR delivery amongst one or more of adjustment of an exhaust valve opening (EVO) timing via the CVVL system, adjustment of a LP-EGR valve position, adjustment of a HP-EGR valve position, and adjustment of a position of the one or more throttles when an EGR shortfall is detected by a nested control system configured to control EGR delivery to the engine. In a first example of the system, the EGR delivery is balanced at least partially based on an operating point of the compressor on a compressor map. In a second example of the system, optionally including the first example, the adjustment of the EVO timing to increase internal EGR is selected at low engine speed/high engine load regions of engine operation and the adjustment of the position of the one or more throttles is selected at high engine speed/low engine load regions of engine operation. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
determining an exhaust valve opening (EVO) timing setpoint at an engine based on an inverse model, the inverse model continuously updated based on an exhaust gas $NO_x$ measurement;
determining an external exhaust gas recirculation (EGR) setpoint based on the inverse model, the external EGR setpoint determined in parallel with the EVO timing setpoint; and
adjusting an EVO timing based on a combination of the EVO timing setpoint and an EGR cylinder balancing feedback loop.

2. The method of claim 1, wherein determining the EVO timing setpoint and the external EGR setpoint includes inputting data from engine sensors into an outer loop of a nested control system, the outer loop including the inverse model.

3. The method of claim 2, wherein adjusting the EVO timing includes commanding modification of a cam phasing at a continuously variable valve lift (CVVL) system via an EVO inner loop of the nested control system and wherein the inner loop includes an EVO timing controller supervisor and an EVO timing position proportional-integral-derivative (PID) controller.

4. The method of claim 3, wherein adjusting the EVO timing further includes providing feedback to the EVO timing PID controller to modify the EVO timing based on a cylinder pressure measured by an in-cylinder pressure sensor.

5. The method of claim 3, wherein the adjusting of the EVO timing further includes inputting a map of EVO timing during steady state engine operation to the EVO inner loop.

6. The method of claim 1, wherein adjusting the EVO timing includes varying the EVO timing to supplement an amount of EGR provided by external EGR when the external EGR is unable to meet an EGR demand.

7. A method for an engine, comprising:
responsive to an increased demand for EGR at the engine;
collecting information from engine sensors to determine an amount of EGR delivered to the engine;
estimating a target EGR setpoint based on the information from the engine sensors via an outer loop of an EGR control system; and
responsive to determination of an EGR shortfall;
increasing internal EGR via a first closed inner loop of the EGR control system.

8. The method of claim 7, wherein collecting information from the engine sensors includes receiving signals from one or more of a feed gas $NO_x$ sensor, a mass air flow sensor, and an exhaust gas sensor, the exhaust gas sensor inferring an air-to-fuel ratio at the engine.

9. The method of claim 7, wherein increasing internal EGR includes adjusting an exhaust valve opening (EVO) timing using a continuously variable valve lift (CVVL) mechanism based on the first closed inner loop and wherein the first closed inner loop is an operation to adjust EVO timing control based on feedback from the engine sensors and an estimated target EVO timing.

10. The method of claim 7, further comprising:
responsive to the increased demand for EGR at the engine,
adjusting a position of an EGR valve of an external EGR system via a second closed inner loop to balance EGR delivery between the internal EGR and the external EGR system and wherein the second closed inner loop is an operation to adjust external EGR flow based on feedback from the engine sensors and an estimated target external EGR flow.

11. The method of claim 10, further comprising adjusting a position of a throttle to decrease air flow to the engine via a third closed inner loop when a combination of internal EGR and external EGR are unable to meet an EGR demand at the engine and wherein the third closed inner loop is an operation to adjust throttle position based on feedback from the engine sensors and an estimated target pressure gradient generated by the throttle position.

12. The method of claim 11, further comprising:
responsive to the determination of the EGR shortfall,
prioritizing the increasing of the internal EGR over adjusting of the position of the throttle to meet the EGR demand.

13. The method of claim 7, wherein increasing the internal EGR includes supplementing an amount of EGR provided by an external EGR system and wherein the external EGR system is controlled by an open inner loop of the EGR control system based on setpoints provided by an engine operating map.

14. The method of claim 13, wherein EGR from the external EGR system is delivered to the engine by one or more of a low pressure (LP)-EGR system and a high pressure (HP)-EGR system and each of the LP-EGR and the HP-EGR systems are controlled by one of a closed inner loop or an open inner loop.

15. The method of claim 7, wherein increasing the internal EGR includes supplementing an amount of EGR provided by an external EGR system and actuating a throttle when a combination of the internal EGR and the external EGR system does not meet an EGR demand and wherein the actuation of the throttle is controlled by an open inner loop of the EGR control system based on setpoints provided by an engine operating map.

16. The method of claim 7, wherein increasing the internal EGR via the first closed inner loop includes inputting a target EVO timing to a PID controller to determine a difference between a current EVO timing and the target EVO timing and adjusting the current EVO timing based on the determined difference.

17. The method of claim 16, wherein adjusting the current EVO timing further includes incorporating cylinder balancing into the current EVO timing based on an estimated air-to-fuel ratio at each cylinder of the engine and moderating the current EVO timing at each cylinder to achieve the cylinder balancing.

18. An engine, comprising:
   a plurality of cylinders, each cylinder having one or more exhaust valves controlling exhaust flow out of the plurality of cylinders;
   a continuously variable valve lift (CVVL) system configured to adjust an exhaust valve opening (EVO) timing of the one or more exhaust valves, wherein the EVO timing is adjusted based on a combination of an EVO timing setpoint determined from an inverse model and an EGR cylinder balancing feedback loop;
   one or more throttles controlling air flow to the plurality of cylinders;
   one or more of a low pressure (LP)-EGR system and a high pressure (HP)-EGR system, each of the LP-EGR system and the HP-EGR system configured to return exhaust gases to the plurality of cylinders through external passages of the engine;
   a compressor arranged in a path of the air flow to the plurality of cylinders; and
   a controller configured with executable instructions stored in non-transitory memory which, when executed, cause the controller to:
      balance EGR delivery amongst one or more of adjustment of the EVO timing via the CVVL system, adjustment of a LP-EGR valve position, adjustment of a HP-EGR valve position, and adjustment of a position of the one or more throttles when an EGR shortfall is detected by a nested control system configured to control EGR delivery to the engine.

19. The engine of claim 18, wherein the EGR delivery is balanced at least partially based on an operating point of the compressor on a compressor map.

20. The engine of claim 18, wherein the adjustment of the EVO timing is to increase internal EGR and is selected at low engine speed/high engine load regions of engine operation, and the adjustment of the position of the one or more throttles is selected at high engine speed/low engine load regions of engine operation.

* * * * *